US011705124B2

(12) United States Patent
Mese et al.

(10) Patent No.: US 11,705,124 B2
(45) Date of Patent: Jul. 18, 2023

(54) ULTRA-WIDEBAND LOCATION TRACKING TO PERFORM VOICE INPUT OPERATION

(71) Applicant: Lenovo (Singapore) Pte. Ltd., Singapore (SG)

(72) Inventors: John Carl Mese, Cary, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 217 days.

(21) Appl. No.: 17/205,265

(22) Filed: Mar. 18, 2021

(65) Prior Publication Data
US 2022/0301556 A1 Sep. 22, 2022

(51) Int. Cl.
*G10L 15/22* (2006.01)
*H04W 4/029* (2018.01)
*G06F 21/32* (2013.01)
*G16Y 40/30* (2020.01)
*H04W 4/02* (2018.01)

(52) U.S. Cl.
CPC ............. *G10L 15/22* (2013.01); *G06F 21/32* (2013.01); *G16Y 40/30* (2020.01); *H04W 4/023* (2013.01); *H04W 4/029* (2018.02); *G10L 2015/223* (2013.01)

(58) Field of Classification Search
CPC ............. G10L 15/22–2015/228; H04W 4/029
See application file for complete search history.

(56) References Cited

U.S. PATENT DOCUMENTS

| 6,563,430 | B1 * | 5/2003 | Kemink ........... H04N 21/42202 |
| | | | 340/8.1 |
| 9,257,133 | B1 * | 2/2016 | Strand ..................... G10L 17/26 |
| 10,841,174 | B1 | 11/2020 | Ely et al. |
| 2007/0109093 | A1 | 5/2007 | Matsubara et al. |
| 2007/0264974 | A1 | 11/2007 | Frank et al. |
| 2010/0048172 | A1 | 2/2010 | Karaoguz |
| 2011/0037712 | A1 | 2/2011 | Kim et al. |
| 2011/0077022 | A1 | 3/2011 | Scovill |
| 2014/0229426 | A1 | 8/2014 | Gootee, III et al. |
| 2014/0253288 | A1 | 9/2014 | O'Brien et al. |
| 2015/0355708 | A1 | 12/2015 | Lee et al. |

(Continued)

FOREIGN PATENT DOCUMENTS

CN 109616107 A * 4/2019 ............. G10L 15/22

OTHER PUBLICATIONS

"Building Digital Key Solution for Automotive", CarConnectivity consortium, retrieved from https://carconnectivity.org/wp-content/uploads/CCC-Digital-Key-White-Paper.pdf.

(Continued)

*Primary Examiner* — Abul K Azad
(74) *Attorney, Agent, or Firm* — John M. Rogitz; John L. Rogitz (57) ABSTRACT

In one aspect, a first device may include at least one processor, an ultra-wideband (UWB) transceiver accessible to the at least one processor, and storage accessible to the at least one processor. The storage may include instructions executable by the at least one processor to receive voice input at the first device and to track a second device using one or more UWB signals received from the second device via the UWB transceiver. The instructions may then be executable to, based on tracking, perform an operation using the voice input.

20 Claims, 6 Drawing Sheets

(56) References Cited

U.S. PATENT DOCUMENTS

| | | | |
|---|---|---|---|
| 2016/0302044 A1 | 10/2016 | Bottazzi et al. | |
| 2017/0154625 A1* | 6/2017 | Heo | G10L 15/28 |
| 2018/0033244 A1 | 2/2018 | Northrup et al. | |
| 2018/0348844 A1 | 12/2018 | Lingutla et al. | |
| 2019/0051073 A1 | 2/2019 | Kuenzi | |
| 2019/0130175 A1 | 5/2019 | Nakashima et al. | |
| 2019/0228601 A1 | 7/2019 | Grzenda et al. | |
| 2019/0242720 A1 | 8/2019 | Shapiro et al. | |
| 2019/0259374 A1* | 8/2019 | Kwon | H04W 12/50 |
| 2020/0084314 A1 | 3/2020 | Mahar et al. | |
| 2020/0228943 A1 | 7/2020 | Martin et al. | |
| 2020/0314651 A1 | 10/2020 | Pirch et al. | |
| 2020/0327753 A1 | 10/2020 | Leiterer et al. | |
| 2020/0334931 A1 | 10/2020 | Ashok et al. | |
| 2021/0082221 A1 | 3/2021 | Zhang et al. | |
| 2021/0117521 A1 | 4/2021 | Gorsica et al. | |
| 2021/0158637 A1 | 5/2021 | Kincaid et al. | |
| 2021/0185485 A1 | 6/2021 | Deixler et al. | |
| 2021/0271909 A1 | 9/2021 | Spell et al. | |
| 2021/0306799 A1 | 9/2021 | Kim et al. | |
| 2021/0409896 A1 | 12/2021 | Ahn et al. | |
| 2022/0026920 A1 | 1/2022 | Afrouzi et al. | |

OTHER PUBLICATIONS

"Car Connectivity Consortium Unveils New Features for Digital Key Specification", Car Connectivity Consortium, Oct. 8, 2019, retrieved from https://carconnectivity.org/press-release/car-connectivity-consortium-unveils-new-features-for-digital-key-specification/.

"Digital Key", Car Connectivity Consortium, 2018, retrieved from https://carconnectivity.org/digital-key/.

"Smart Phone Digital Key", Car Connectivity Consortium, 2018, retrieved from https://carconnectivity.org/wp-content/uploads/CCC-Digital-Key-Brochure.pdf.

"Whitepaper—Digital Key—The Future of Vehicle Access", CarConnectivity Consortium, 2020, retrieved from https://carconnectivity.org/wp-content/uploads/2020/03/CCC_Digital_Key_2.0.pdf.

Jakes et al., "Ultra-Wideband to Identify and Control Other Device", file history of related U.S. Appl. No. 17/204,900, filed Mar. 17, 2021.

Jakes et al., "Unlocking Lock on Device Based on Ultra-Wideband Location Tracking", file history of related U.S. Appl. No. 17/204,617, filed Mar. 17, 2021.

Mese et al., "Ultra-Wideband-Based Device Using Restrictions", file history of related U.S. Appl. No. 17/204,844, filed Mar. 17, 2021.

Mese et al., "Unlocking and/or Awakening Device Based on Ultra-Wideband Location Tracking", file history of related U.S. Appl. No. 17/204,543, filed Mar. 17, 2021.

Jakes et al., "Unlocking Lock on Device Based on Ultra-Wideband Location Tracking", related U.S. Appl. No. 17/204,617, Non-Final Office Action dated Mar. 28, 2022.

Jakes et al., "Unlocking Lock on Device Based on Ultra-Wideband Location Tracking", related U.S. Appl. No. 17/204,617, Non-Final Office Action response filed Apr. 7, 2022.

Jakes et al., "Ultra-Wideband to Identify and Control Other Device", related U.S. Appl. No. 17/204,900, Non-Final Office Action dated filed Mar. 11, 2022.

Jakes et al., "Unlocking Lock on Device Based on Ultra-Wideband Location Tracking", related U.S. Appl. No. 17/204,617, Non-Final Office Action dated Sep. 7, 2021.

Jakes et al., "Unlocking Lock on Device Based on Ultra-Wideband Location Tracking", related U.S. Appl. No. 17/204,617, Applicant's response to Non-Final Office Action filed Nov. 22, 2021.

Jakes et al., "Unlocking Lock on Device Based on Ultra-Wideband Location Tracking", related U.S. Appl. No. 17/204,617, Final Office Action dated Jan. 25, 2022.

Jakes et al., "Ultra-Wideband to Identify and Control Other Device", related U.S. Appl. No. 17/204,900, Applicant's response to Non-Final Office Action filed May 31, 2022.

"FiRa Consortium", Wikipedia, retrieved from https://en.wikipedia.org/wiki/FiRa_Consortium on Feb. 16, 2021.

"Smart Home and Consumer", Fira: The Power to be Precise. Retrieved from https://www.firaconsortium.org/discover/use-cases/smart-home-consumer on Feb. 26, 2021.

"Speech to Text: A Speech service feature that accurately transcribes spoken audio to text", Microsoft Azure, retrieved from https://azure.microsoft.com/en-us/services/cognitive-services/speech-to-text/ on Feb. 26, 2021.

"Ultra-Wideband Technology", Infsoft, retrieved from https://www.ultrawideband.io/en/technology.php on Feb. 16, 2021.

"Ultra-wideband", Wikipedia, retrieved from https://en.wikipedia.org/wiki/Ultra-wideband on Feb. 16, 2021.

Wilhite, Tamara, "An Introduction to UWB Antennas", Turbo Future, Jan. 14, 2021, retrieved from https://turbofuture.com/misc/An-lntroduction-to-UWB-Antennas.

Zwirello et al., "UWB Localization System for Indoor Applications: Concept, Realization and Analysis", Hindawi Publishing CorporationJournal of Electrical and Computer Engineering, vol. 2012, May 28, 2012. Retrieved from https://www.hindawi.com/journals/jece/2012/849638/.

Mese et al., "Unlocking and/or Awakening Device Based on Ultra-Wideband Location Tracking", related U.S. Appl. No. 17/204,543, Non-Final Office Action dated Dec. 9, 2021.

Mese et al., "Unlocking and/or Awakening Device Based on Ultra-Wideband Location Tracking",related U.S. Appl. No. 17/204,543, Applicant's response to Non-Final Office Action filed Jan. 6, 2022.

Jakes et al., "Unlocking Lock on Device Based on Ultra-Wideband Location Tracking", related U.S. Appl. No. 17/204,617, Applicant's response to Final Office Action filed Mar. 3, 2022.

Mese et al., "Ultra-Wideband Location Tracking to Perform Voice Input Operation", related U.S. Appl. No. 17/204,844, Non-Final Office Action dated Feb. 21, 2023.

Mese et al., "Ultra-Wideband Location Tracking to Perform Voice Input Operation", related U.S. Appl. No. 17/204,844, Applicant's response to Non-Final Office Action filed Feb. 27, 2023.

Wilken, "Places nearby: Facebook as a location-based social media platform", Swinburne University of Technology, Australia, 2014, vol. 16(7).

* cited by examiner

ULTRA-WIDEBAND LOCATION TRACKING TO PERFORM VOICE INPUT OPERATION

FIELD

The disclosure below relates to technically inventive, non-routine solutions that are necessarily rooted in computer technology and that produce concrete technical improvements. In particular, the disclosure below relates to techniques for ultra-wideband (UWB) location tracking to perform a voice input operation.

BACKGROUND

As recognized herein, securely authenticating users to use electronic devices is important to prevent unauthorized individuals from easily hacking the devices, gaining access to sensitive electronic data, etc. As also recognized herein, many existing forms of authentication that used to be sufficient are becoming less so due to advances in technology that can be used to subvert those forms of authentication. There are currently no adequate solutions to the foregoing computer-related, technological problem.

SUMMARY

Accordingly, in one aspect a first device includes at least one processor, an ultra-wideband (UWB) transceiver accessible to the at least one processor, and storage accessible to the at least one processor. The storage includes instructions executable by the at least one processor to receive voice input to execute a command using the first device, and to track a location of a second device different from the first device using one or more UWB signals received from the second device via the UWB transceiver. The instructions are also executable to, based on the location of the second device and the voice input, execute the command using the first device.

In some example implementations, the instructions may be executable to track the location of the second device using the one or more UWB signals to determine that the second device is within a predetermined area relative to the first device and to, based on the voice input and the determination that the second device is within the predetermined area, execute the command using the first device. In these implementations, the instructions may also be executable to track the location to determine that the second device is not within the predetermined area relative to the first device and, based on the determination that the second device is not within the predetermined area, decline to execute the command using the first device. Additionally, if desired the instructions may be executable to execute voice identification (ID) using the voice input to identify a particular user that provided the voice input as being a user for which voice control of at least one feature of the first device is authorized, and then to execute the command using the first device based on the identification of the particular user and the determination that the second device is within the predetermined area. The at least one feature may relate to adjustment of a parameter of an Internet of things (IoT) device, such as an IoT thermostat where the parameter may relate to a setting for the thermostat. In some examples, the at least one feature may even include each feature of the first device controllable through voice input.

Also, in some example implementations, the instructions may be executable to determine that the second device is currently oriented in a way that conforms to a predefined orientation and, based on the voice input and the determination that the second device is currently oriented in a way that conforms to the predefined orientation, execute the command using the first device. The instructions may be executable to track the location of the second device using the one or more UWB signals to determine the current orientation of the second device via the one or more UWB signals. Additionally, or alternatively, the instructions may be executable to receive data from the second device indicating the current orientation of the second device, where the data may be generated based on input from a gyroscope on the second device. Additionally, in some cases the instructions may be executable to track the location of the second device using the one or more UWB signals to determine that the second device is within a predetermined area relative to the first device and then execute the command using the first device based on the voice input, the determination that the second device is within the predetermined area, and the determination that the second device is currently oriented in a way that conforms to the predefined orientation.

In another aspect, a method includes receiving voice input at a first device and tracking a second device using one or more ultra-wideband (UWB) signals received from the second device. The method also includes, based on tracking, performing an operation using the voice input at the first device.

The operation may include authentication of a user at least in part based on the voice input, and/or the operation may include execution of a command provided via the voice input.

Additionally, in some examples the method may include tracking a location of the second device using the one or more UWB signals and, based on the location of the second device, performing the operation using the voice input. Additionally, or alternatively, the method may include tracking an orientation of the second device using the one or more UWB signals and, based on the orientation of the second device, performing the operation using the voice input.

In still another aspect, at least one computer readable storage medium (CRSM) that is not a transitory signal includes instructions executable by at least one processor to receive voice input at a first device, to track a second device using one or more ultra-wideband (UWB) signals received from the second device, and to perform an operation using the voice input based on tracking.

In some examples, the instructions may be executable to identify a direction in which a source of the voice input is located and/or a location at which the source of the voice input is located. Then based on the identification(s), the instructions may be executable to determine that a current location of the second device as determined from the tracking matches, to at least within a threshold level of tolerance, one or more of the direction in which the source is located and the location at which the source is located. The instructions may then be executable to perform the operation based on the determination of the match. Additionally, if desired the instructions may be executable to use a directional microphone to identify the direction, and then determine that the current location of the second device matches the direction based on the identification of the direction to subsequently perform the operation based on the determination of the match.

The details of present principles, both as to their structure and operation, can best be understood in reference to the accompanying drawings, in which like reference numerals refer to like parts, and in which:

DETAILED DESCRIPTION

Among other things, the detailed description below discusses enabling voice-controlled devices to require a UWB positional or orientation element to verify a voice authentication request. Thus, precise location capabilities of UWB technology can be used so that only voice data that matches the expected voiceprint and that also meets a defined positional or orientation factor may be eligible for authentication. Indeed, the disclosure below recognizes that UWB signals can be hard to spoof. As such, the UWB-based restriction(s) may be positional (e.g., the UWB signal-transmitting device might need to be in a certain predefined location) and/or may relate to a certain device orientation (e.g., the UWB signal-transmitting device is to be held in a certain way). Additionally, in some examples the UWB signal-transmitting device might only transmit a UWB signal(s) for location tracking and/or authentication by another device once the transmitting device determines that it is in the correct orientation.

As an example, a user might want to change settings of a smart thermostat, but the thermostat may require a verified UWB signal from a personal device of the user to be present to execute the thermostat adjustment.

As another example, suppose a user issues a voice command to a voice assistant. The voice assistant may be set to require an accompanying UWB signal from the user's personal device to be detected before executing the command. In particular, the voice assistant device may detect that the expected UWB signal is coming from the same location as it detected the voice as coming from. The command to perform the action, such as subscribing to an unlimited music service, may then be approved. Also, according to this example, in some embodiments the personal device may be required to be held in a specific orientation (e.g., vertical) for authorization of the voice command.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
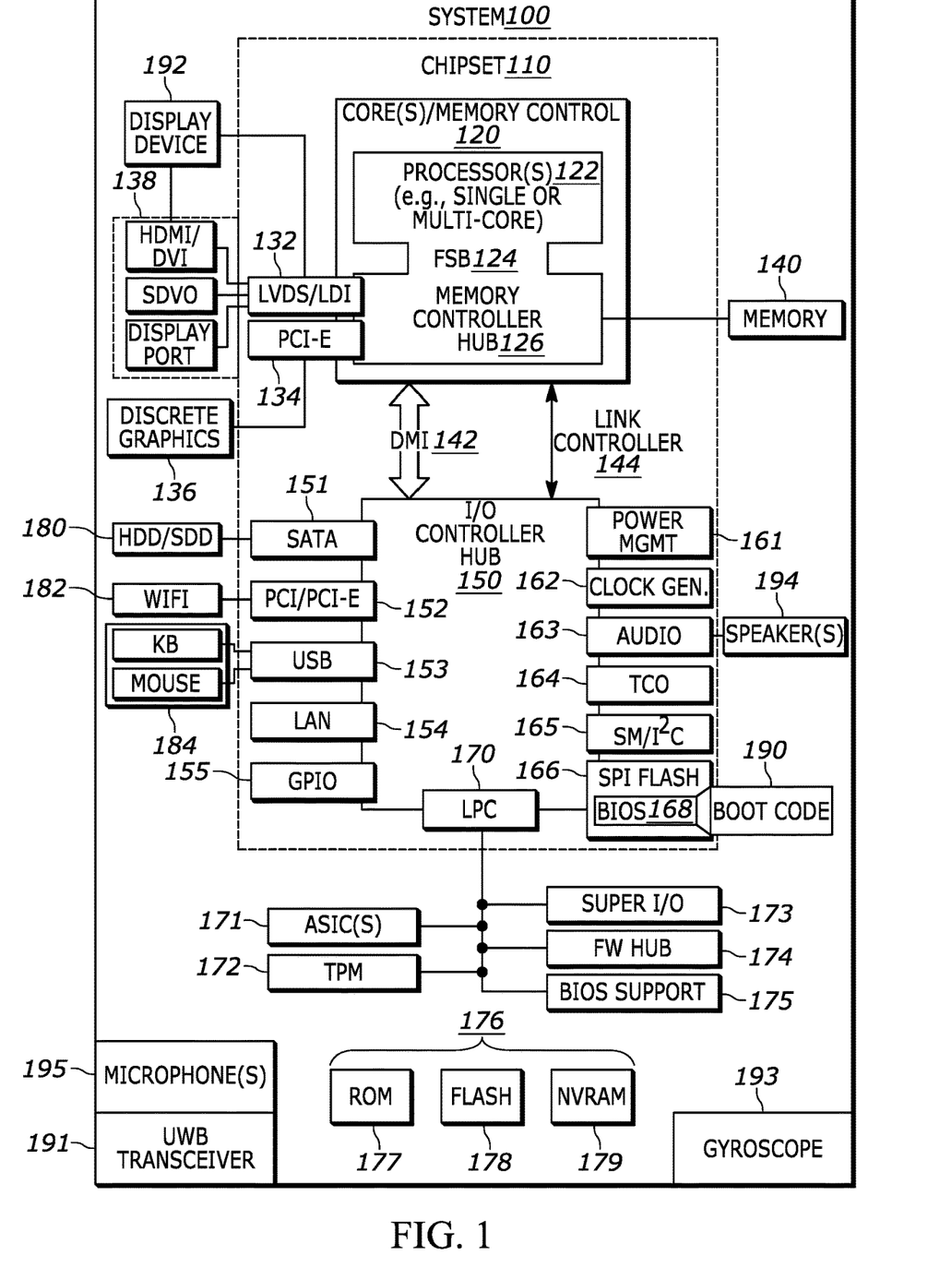
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include an ultra-wideband (UWB) transceiver 191 configured to transmit and receive data using UWB signals and UWB communication protocol(s), such as protocols set forth by the FiRa Consortium. As understood herein, UWB may use low energy, short-range, high-bandwidth pulse communication over a relatively large portion of the radio spectrum. Thus, for example, an ultra-wideband signal/pulse may be established by a radio signal with fractional bandwidth greater than 20% and/or a bandwidth greater than 500 MHz. UWB communication may occur by using multiple frequencies (e.g., concurrently) in the frequency range from 3.1 to 10.6 GHz in certain examples.

To transmit UWB signals consistent with present principles, the transceiver 191 itself may include one or more Vivaldi antennas and/or a MIMO (multiple-input and multiple-output) distributed antenna system, for example. It is to be further understood that various UWB algorithms, time difference of arrival (TDoA) algorithms, and/or angle of arrival (AoA) algorithms may be used for system 100 to determine the distance to and location of another UWB transceiver on another device that is in communication with the UWB transceiver on the system 100 to thus track the real-time location of the other device. The orientation of the other device may also be tracked via the UWB signals.

Still in reference to FIG. 1, the system 100 may also include a gyroscope 193 that senses and/or measures the orientation of the system 100 and provides related input to the processor 122. Additionally, though not shown for simplicity, in some embodiments the system 100 may include an accelerometer that senses acceleration and/or movement of the system 100 and provides related input to the processor 122.

Still further, the system 100 may include an audio receiver/microphone 195 that provides input from the microphone to the processor 122 based on audio that is detected, such as via a user providing audible input to the microphone consistent with present principles. In some examples, the microphone 195 may actually be a microphone array so that a beamforming algorithm can be executed based on input to the array to determine a direction of a source of sound relative to the microphone 195.

Though also not shown, the system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
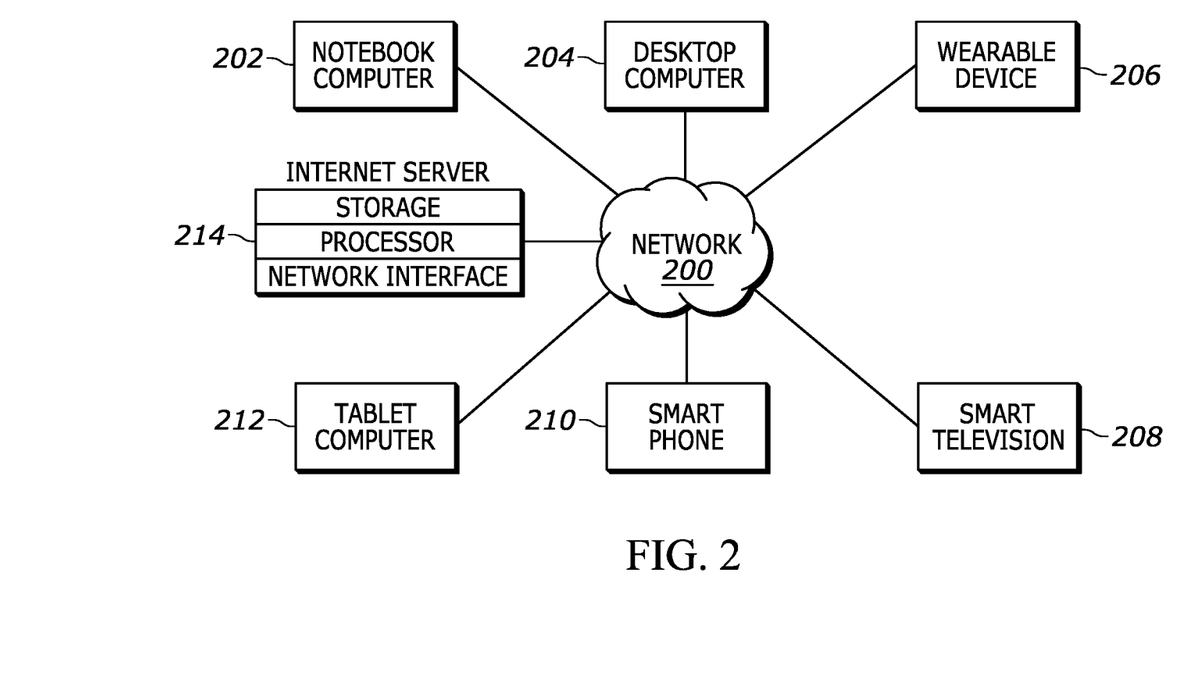
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 and/or UWB to undertake present principles.

Figure 3:
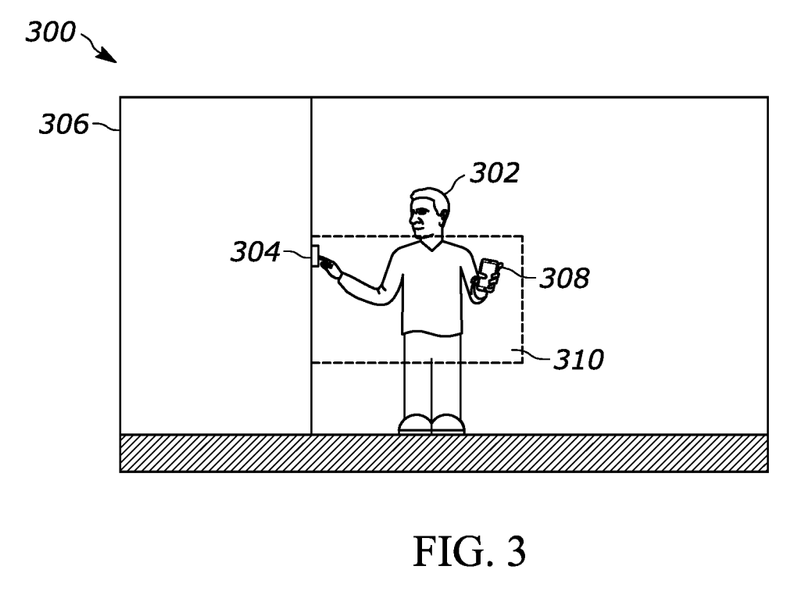
FIG. 3 is an example illustration of an end-user with a smartphone controlling a thermostat while the thermostat tracks the location of the smartphone using UWB consistent with present principles.

Referring now to the example illustration 300 shown in FIG. 3, suppose an end-user 302 wishes to adjust one or more parameters of an Internet of things (IoT) device such as a smart, Internet-connected thermostat 304 that is mounted on a wall 306 of a personal residence. Consistent with present principles, to prevent anyone other than an authorized user from adjusting the settings of the thermostat 304, the thermostat 304 may require that another device such as a smartphone 308 (that is associated with an authorized user) be located within a predetermined, three-dimensional (3D) area 310 in front of the thermostat 304 while the user 302 adjusts the settings by hand or even with voice commands or through another method. The settings themselves may relate to, for example, as a desired room temperature, or whether a heater or air conditioning unit of a connected heating, ventilation, and air conditioning (HVAC) system is on or off.

Whether the phone 308 or other authorized device is within the area 310 may be determined based on UWB signals received at the UWB transceiver of the thermostat 304, as transmitted by the UWB transceiver on the phone 308. Thus, real-time UWB location tracking may be performed for the thermostat 304 to determine the absolute current location of the phone 308 based on the known absolute location of the thermostat 304. Additionally, or alternatively, the thermostat 304 may determine the current location of the phone 308 relative to the location of the thermostat 304.

As also shown in FIG. 3, the predetermined area 310 itself may be an area in a particular direction relative to the thermostat 304, such that the area extends outward from the wall 306 and/or the front face of the thermostat 304 and into open space where the user 302 is standing. And further note that in some examples, the thermostat 304 may require that the device 308 be located within the area 310 for at least a threshold amount of time to avoid false triggers where the user might simply walk by the thermostat 304 while someone else who is not authorized attempts to adjust its settings. Thus, in using UWB location tracking to determine whether the phone 308 is within the area 310 for the threshold amount of time, the thermostat 304 may implement increased device security to ensure only authorized users are present to adjust the settings of the thermostat 304.

To further increase security, in addition to requiring the phone 308 to be within the area 310, in some examples the thermostat 304 may also require that the phone 308 be held in a particular orientation in order to permit an associated user to adjust the settings of the thermostat 304. This may also help prevent unauthorized adjustment of the thermostat 304 if, for example, an unauthorized user gains control of the phone 308 to bring it within the area 310 to adjust the settings of the thermostat 304, but still does not know the particular orientation itself or that holding the phone 308 in any particular orientation would even be needed.

The particular orientation of the phone 308 may be a custom orientation set in advance by the user 302. Or the orientation may be predefined, such as horizontal or vertical relative to ground along a plane established by the front face of the display of the phone 308. Additionally, note that in some examples the current orientation of the phone 308 need not be exact compared to the already-established orientation (whether custom or not) to allow adjustment of the thermostat settings. But the thermostat 304 may still require an orientation match to within a threshold level of confidence, such as plus or minus three degrees relative to the plane of the front face of the display, to allow for some unintentional user error while still ensuring the phone 308 is nonetheless held more or less in the correct orientation to control the thermostat 304.

Still further, note that the thermostat 304 may determine the orientation of the phone 308 based on the angle of arrival of UWB signals received from the phone 308 and the known location of UWB transceiver within the housing of the phone 308. Additionally, or alternatively, the orientation of the phone 308 may be determined by the thermostat 304 based on orientation data transmitted wirelessly to the thermostat 304 from the phone 308 as generated at the phone 308 using the gyroscope or other orientation sensor on the phone 308.

Further still, to increase security even further, in some examples in order for the user 302 to adjust the settings of the thermostat 304, the thermostat 304 may require that UWB signals received from the phone 308 (e.g., as part of the location tracking) indicate a unique UWB signature for the device and/or valid user login information such as a username and password. In addition to or in lieu of that, if the thermostat 304 is being controlled through voice input, a voice identification (ID) algorithm may be executed by the thermostat 304 (or connected server) using the voice input to authenticate an identified person as being authorized to control the thermostat 304. These things may help the thermostat 304 distinguish between various users and their associated personal devices where, for example, different authorized users have different permission levels.

For example, the user 302 may have administrator privileges to adjust any and all settings of the thermostat 304 while another user such as a child may have lesser privileges. Thus, the child may be permitted to adjust the temperature setting for the thermostat 304 within a range defined by the user 302, but that is less than the entire range for the thermostat. E.g., the child may be authorized to only adjust the temperature of the thermostat 304 between seventy-two- and seventy-six-degrees Fahrenheit, whereas the user 302 may himself or herself may be authorized to adjust the temperature between the thermostat's low and high ends (that exceed seventy-two and seventy-six degrees, respectively). Additionally, the child might be disallowed from turning on and/or turning off the heater or air conditioning unit controlled by the thermostat 304, even though the user 302 himself or herself may be authorized to do so.

Figure 4:
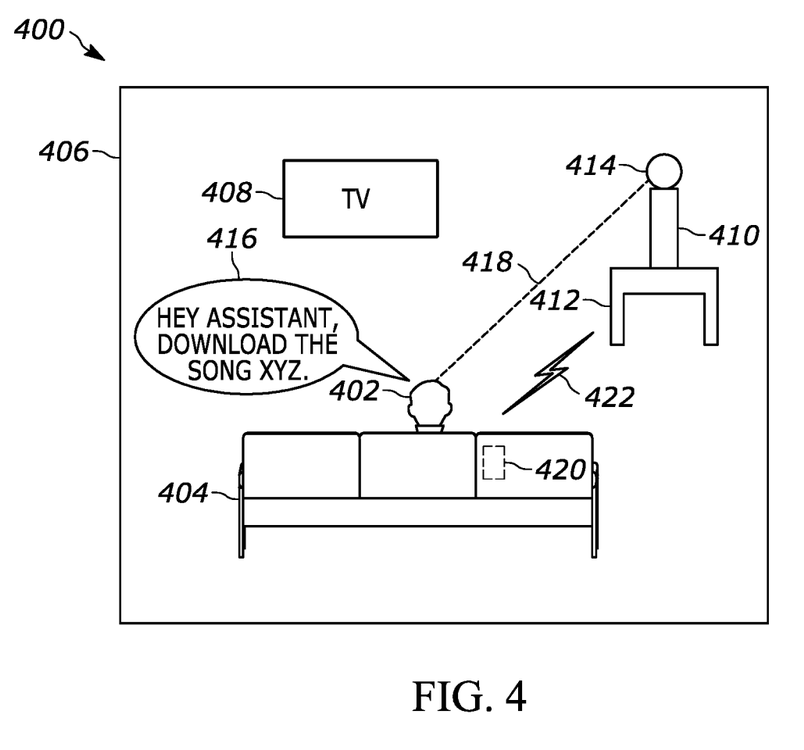
FIG. 4 is an example illustration of an end-user with a smartphone controlling a digital assistant device while the digital assistant device tracks the smartphone using UWB consistent with present principles.

Before moving on to the description of FIG. 4, note that the other UWB-enabled device communicating with the thermostat 304 need not be a smartphone and might instead be another type of personal device such as, for example, a wearable smartwatch, tablet computer, a laptop computer, electronic glasses, or an augmented reality (AR) or virtual reality (VR) headset, etc. Also note that the IoT device to be controlled need not be limited to a thermostat and that other IoT devices such as a smart oven or smart window shades might also be controlled using a UWB-based predefined area, device orientation, etc. in a similar manner (e.g., to adjust the temperature of the oven or whether it is on/off, or to raise or lower the window shades). Nor does the UWB-enabled device to be controlled need be an IoT device at all. It may be another personal device, for example, or per FIG. 4 it may even be a stand-alone digital assistant device that can be voice-controlled.

Thus, now in reference to FIG. 4, it shows another example illustration 400 consistent with present principles. In this example, a user 402 is sitting on a couch 404 in a living room of a personal residence 406 while watching content presented on a television 408. A stand-alone digital assistant device 410 is also in the living room, resting on a table 412. The stand-alone digital assistant device 410 may have a processor and storage for executing a digital assistant application like Amazon's Alexa, Apple's Siri, or Google's Assistant, and may also include a speaker for providing audio as well as a microphone or microphone array 414 for receiving voice input.

For example, the array 414 may include an array of directional microphones that are oriented outward at different orientations so that a source of sound can be localized and/or the direction from which it came determined using beamforming or another type of signal processing algorithm. In the present example, the source of sound is the user 402 since the user 402 is providing a voice command to the digital assistant device 410 while sitting on the couch 404. Also, in the present example, the command being provided is to purchase and download a particular song titled "XYZ", as illustrated by the speech bubble 416. Thus, based on the voice command, the device 410 may identify a bearing or direction 418 to the user 402 via the array 414.

Moreover, in addition to identifying the location of or direction 418 toward the source (the user 402), the device 410 may also determine a current location of a personal device associated with the user 402, such as the user's smartphone 420 that may be resting on a seat of the couch 404 next to the user 402. The current location of the phone 420 may be determined using UWB signals 422 transmitted from the phone 420 to the device 410 for UWB location tracking. The device 410 may then determine whether a current location of the phone 420 (as determined from the tracking) matches, to at least within a threshold level of tolerance, the direction 418 in which the user 402 is located and/or the location at which the user 402 is located. The threshold level of tolerance may be, for example, plus or minus five degrees relative to the direction 418 in the X and/or Y dimensions to thereby account for the fact that the phone 420 might not be on the user's person but still near the person, as depicted in this example. Then responsive to a match, the device 410 may perform an operation such as executing the command to download the song XYZ as provided verbally by the user 402.

Thus, here again UWB location tracking may be used to limit unauthorized people from controlling any/all features of the device 410, such as making purchases on the account of the user 402 or performing other actions controllable through voice input. UWB location tracking may also be used to limit unauthorized people from taking actions to control still other devices (e.g., IoT devices) that are connected to the device 410 so the device 410 may control them. If desired, in some examples UWB location tracking may even be used in addition to voice ID itself to authenticate, prior to executing the voice command, a particular user as providing the voice command. Thus, voice ID may be used as an added layer of security to further limit the potential for unauthorized people to control the device 410.

Still in reference to FIG. 4 but more generally, note that UWB location tracking may be performed to confirm a voice ID itself. For example, owing to deepfake technology becoming more prevalent and affording the ability to spoof another person's voice, UWB location tracking may be performed by the device 410 to confirm that a device associated with an authorized user (the device 420 in this case) is proximate to the source of the voice command to the threshold level of tolerance discussed above. This may be done to determine that the authorized user himself or herself issued the verbal command, as confirmed by the presence of the user's personal device near the user, rather than another person attempting to spoof the voice of the authorized user when the authorized user is not actually present with his/her personal device.

Figure 5:
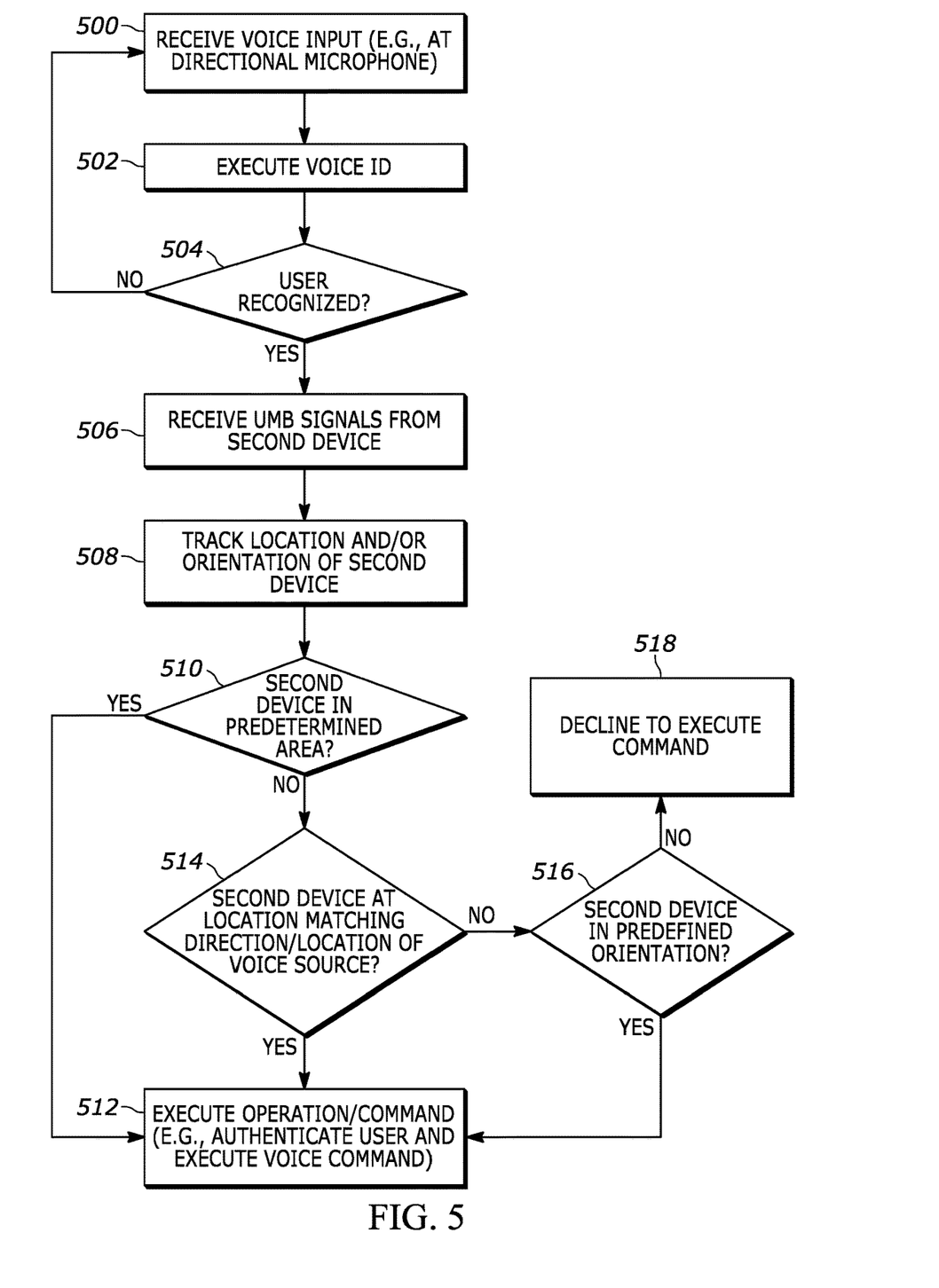
FIG. 5 illustrates example logic in example flow chart format that may be executed by a device performing UWB location tracking consistent with present principles.

Continuing the detailed description in reference to FIG. 5, it shows example logic that may be executed by a first device such as the system 100, thermostat 304, or device 410 consistent with present principles. Note that while the logic of FIG. 5 is shown in flow chart format, state logic or other suitable logic may also be used.

Beginning at block 500, the first device may receive voice input possibly via a directional microphone as described above (and/or receive another type of input such as touch input to a display of the first device). From block 500 the logic may then proceed to block 502 where the first device may execute a voice identification/authentication algorithm to determine, at decision diamond 504, whether a person recognized from the voice input is an authorized user that is authorized to control the first device. To this end, a relational database correlating respective user IDs to authorization or non-authorization may be accessed to make the determination at diamond 504.

Responsive to a negative determination at diamond 504, the logic may revert back to block 500 and proceed therefrom. However, responsive to an affirmative determination at diamond 504, the logic may instead proceed to block 506. At block 506 the first device may receive one or more UWB signals from a second device associated with the user to, at block 508, track the location and/or orientation of the second device using the UWB signals. The logic may then proceed to decision diamond 510 where the first device may determine, based on the UWB location tracking, whether the second device is within a predetermined area relative to the first device as set forth above.

Responsive to an affirmative determination at diamond 510, the logic may proceed to block 512 where the first device may execute a particular operation and/or execute the specific command indicated in the voice input or other input received at block 500. For example, at block 512 the operation may involve the first device authenticating the user using both voice ID and UWB signals from the second device that themselves identify the user and/or second device (e.g., as a form of two-factor authentication). And also, at block 512 as indicated above, the first device may execute the user command itself, such as adjusting the parameter of an IoT device, audibly providing a weather report responsive to a verbal request for the current weather, download a song file, etc.

However, responsive to a negative determination at diamond 510, the logic may instead proceed to decision diamond 514. At diamond 514 the first device may determine whether the second device is at a location as determined from the UWB location tracking that matches a direction or location of the source of the voice input itself (e.g., as determined using directional microphones per the description above in relation to FIG. 4). An affirmative determination at diamond 414 may then cause the logic to proceed to block 512 as described above.

However, a negative determination at diamond 514 may instead cause the logic to proceed to decision diamond 516 where the first device may determine whether the second device is oriented in a way that conforms to a predefined orientation as also described above. Again, note that the predefined orientation may be determined from UWB location tracking performed at the first device, and/or from gyroscope data received from the second device. An affirmative determination at diamond 516 may also result in the logic proceeding to block 512 as described above, whereas a negative determination at diamond 516 may instead cause the logic to move to block 518. At block 518 the first device may decline to execute the command and, if desired, revert back to block 500.

Figure 6:
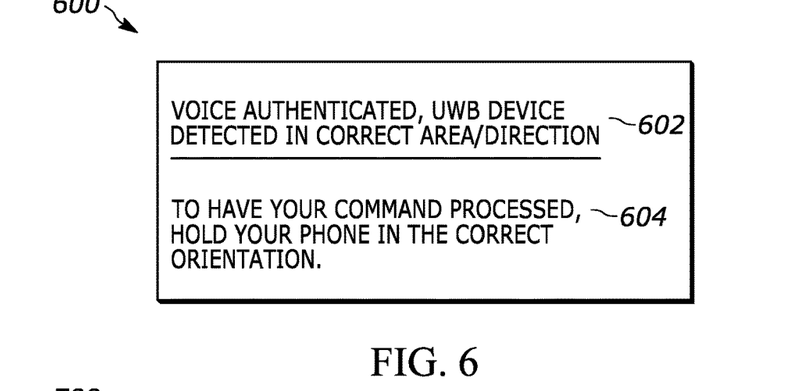
FIG. 6 shows an example graphical user interface (GUI) that may be presented on a display based on UWB location tracking consistent with present principles.

Before moving on to the description of FIG. 6, note with respect to FIG. 5 that although the affirmative determinations made at diamonds 510, 514, and 516 may be executed in the alternative to reach block 512 as shown on the face of FIG. 5, in other examples an affirmative determination at two or even all three of these decision diamonds may be required to reach block 512, thereby further enhancing the security of the first device.

Now describing FIG. 6, it shows an example graphical user interface (GUI) 600 that may be presented on the display of the first device of FIG. 5, a display of the thermostat 304, a display of the device 410, etc. As shown, the GUI 600 may include a notification 602 that an authorized user's voice has been authenticated via voice ID. The notification 602 may also indicate that the authorized user's personal device has been detected, via UWB location tracking, as being within a predetermined area (such as the area 310) and/or being in a direction matching the identified source of the voice input itself (the authorized user).

As also shown in FIG. 6, the GUI 600 may include a prompt 604 indicating that the authorized user is to also hold his/her personal in a predefined orientation to execute the command, where again the predefined orientation may be known to the user but not to others to thereby act as another form of authentication. Then once the authorized user places his/her device in the correct orientation as prompted, the first device may recognize as much and then process the voice command.

Figure 7:
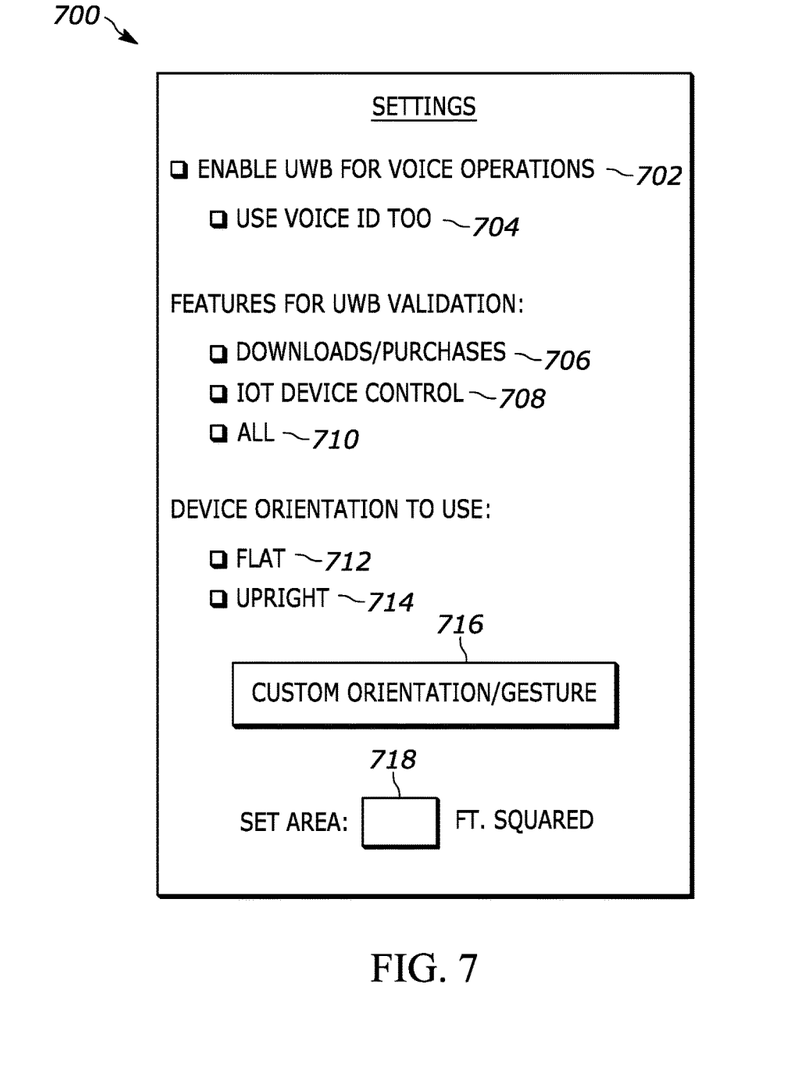
FIG. 7 shows an example GUI that may be presented on a display to configure one or more settings of a device to operate consistent with present principles.

Now in reference to FIG. 7, it shows an example GUI 700 that may be presented on the display of a device that is configured to undertake present principles, such as the display of the first device of FIG. 4. The GUI 700 may be presented based on navigation of a settings menu, and may be used for configuring one or more settings of the first device to operate consistent with present principles. It is to be understood that each option or sub-option to be discussed below may be selected by directing touch or cursor input to the respectively adjacent check box.

As shown in FIG. 7, the GUI 700 may include a first option 702 that may be selectable to set or configure the first device to, in the future, perform UWB location tracking of other devices to execute voice commands (and/or other commands such as touch-based commands) consistent with present principles. For example, the option 702 may be selected to enable the device to execute the logic of FIG. 5, present the GUI 600, present the GUI 800 that will be described later, perform the operations of the thermostat 304 described above, and/or perform the operations of the device 410 described above.

If desired, in some examples the option 702 may be accompanied by a sub-option 704. Sub-option 704 may be selected to set or enable the first device to specifically also perform voice ID/authentication in addition to using UWB location tracking to execute a command as described herein. Thus, sub-option 704 may be selected to add another level of security to the operations executable by the first device.

As also shown in FIG. 7, the GUI 700 may include options 706, 708, and 710. These options may be selected to select various features of the first device for which UWB location tracking should be performed to validate an associated command itself. Accordingly, option 706 may be selected to set or enable the first device to perform UWB location tracking for commands to purchase and/or download digital assets or even items from an e-commerce site. Option 708 may be selected to set or enable the first device to perform UWB location tracking for user control of IoT devices. Option 710 may be selected to perform UWB location tracking for each/all features of the first device controllable through voice input or other input like touch input.

Additionally, in some examples the GUI 700 may include options 712, 714 for the user to select a respective flat/horizontal or upright/vertical orientation of a personal device to use as another form of authentication and/or verification that a command should be executed as described herein. However, if desired the user may select selector 716 to initiate a process to define a custom orientation, or even custom gesture, to use instead of one the flat or upright orientations corresponding to options 712, 714. Thus, the selector 716 may be selected to present a GUI like the GUI 800 of FIG. 8, which will be described shortly.

However, still in reference to FIG. 7, in some examples the GUI 700 may further include an input box 718 at which the user may enter a number to establish a predetermined area as described herein as a certain predetermined number of square feet (or other increment like meters) to thus establish the three-dimensional size of the box-like area itself. However, further note that the predetermined area may take other shapes as well, such as a cone shape with the vertex extending from the respective device to be controlled, or even the shape of a sphere.

Figure 8:
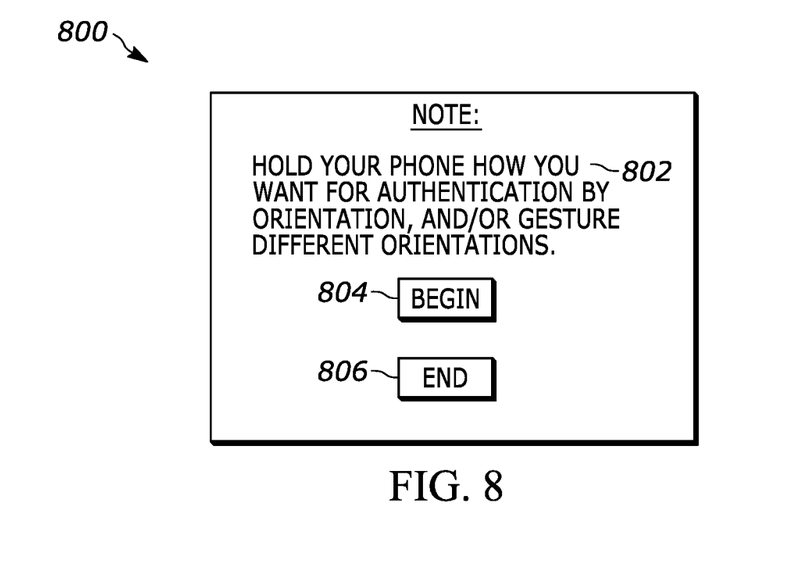
FIG. 8 shows an example GUI that may be presented on a display to prompt a user to establish an orientation of his/her device to use for UWB location tracking and execution of voice commands consistent with present principles.

Now describing FIG. 8, it shows the aforementioned GUI 800 that may be presented responsive to selection of the selector 716 from the GUI 700. As shown, the GUI 800 may include a prompt 802 indicating that the user should hold his/her personal device in whatever orientation they want to use for authentication and/or verification that a command should be executed. The orientation may be an inverted orientation or diagonal orientation, for example, relative to the front face of the display of the device as viewed upright. Additionally, or alternatively, a series of orientations may be used for authentication and/or verification that a command should be executed, as established by one or more gestures the user makes by holding the personal device in their hand and moving it in free space.

Thus, when ready the user may select the selector 804 for the device to begin UWB location tracking and/or tracking using gyroscope data for the user to thus establish the particular orientation or gesture that is desired. Once the personal device is in the desired orientation or the desired gesture has been completed, selector 806 may then be selected to end the tracking and command the personal device to save the orientation/gesture data in persistent local storage and/or at a remotely-located server so that the orientation/gesture data may be used at a later time as described above.

Figure 9:
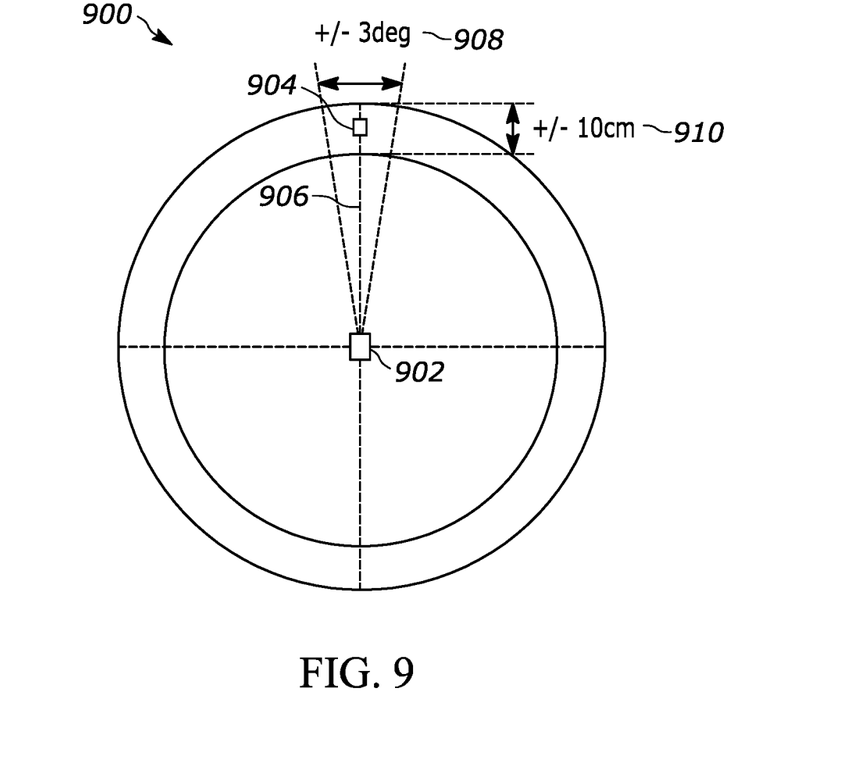
FIG. 9 shows an example illustration of UWB location accuracy consistent with present principles.

Now in reference to FIG. 9, it shows an example illustration 900 of UWB location accuracy. As shown, a first device 902 that might be executing the logic of FIG. 5 may determine a bearing 906 to a second device 904 using UWB signal exchange, which may be accurate to plus/minus three degrees 908 or even less. Depth (distance) between the first device 902 and second device 904 may also be determined using UWB to plus/minus ten centimeters 910 or even less. Thus, the device 902 may determine the location of the device 904 relative to the device 902 with relatively high accuracy. So, for example, the device 902 may determine whether the second device 904 comes within a predetermined area as set forth above to determine whether to execute a requested command or operation consistent with present principles.

It may now be appreciated that present principles provide for an improved computer-based user interface that increases the functionality, accuracy, and security of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
    at least one processor;
    an ultra-wideband (UWB) transceiver accessible to the at least one processor; and
    storage accessible to the at least one processor and comprising instructions executable by the at least one processor to:

receive voice input to execute a command using the first device;
use a directional microphone to identify a direction in which a source of the voice input is located;
track a location of a second device different from the first device using one or more UWB signals received from the second device via the UWB transceiver;
based on the identification using the directional microphone of the direction in which the source of the voice input is located, determine that the location of the second device as determined from the tracking matches, to at least within a threshold level of tolerance, the direction in which the source is located; and
based the voice input and the determination of the match, execute the command using the first device.

2. The first device of claim 1, wherein the instructions are executable to:
track the location of the second device using the one or more UWB signals to determine that the second device is within a predetermined area relative to the first device; and
based on the voice input and the determination that the second device is within the predetermined area, execute the command using the first device.

3. The first device of claim 2, wherein the instructions are executable to:
track the location to determine that the second device is not within the predetermined area relative to the first device; and
based on the determination that the second device is not within the predetermined area, decline to execute the command using the first device.

4. The first device of claim 2, wherein the instructions are executable to:
execute, using the voice input, voice identification (ID) to identify a particular user that provided the voice input as being a user for which voice control of at least one feature of the first device is authorized; and
based on the identification of the particular user and the determination that the second device is within the predetermined area, execute the command using the first device.

5. The first device of claim 4, wherein the at least one feature comprises each feature of the first device controllable through voice input.

6. The first device of claim 4, wherein the at least one feature relates to adjustment of a parameter of an Internet of things (IoT) device.

7. The first device of claim 6, wherein the IoT device comprises a thermostat, and wherein the parameter relates to a setting for the thermostat.

8. The first device of claim 1, wherein the instructions are executable to:
determine that the second device is currently oriented in a way that conforms to a predefined orientation; and
based on the voice input and the determination that the second device is currently oriented in a way that conforms to the predefined orientation, execute the command using the first device.

9. The first device of claim 8, wherein the instructions are executable to:
track the location of the second device using the one or more UWB signals to determine the current orientation of the second device via the one or more UWB signals.

10. The first device of claim 8, wherein the instructions are executable to:

receive data from the second device indicating the current orientation of the second device, the data generated based on input from a gyroscope on the second device.

11. The first device of claim 8, wherein the instructions are executable to:
track the location of the second device using the one or more UWB signals to determine that the second device is within a predetermined area relative to the first device; and
based on the voice input, the determination that the second device is within the predetermined area, and the determination that the second device is currently oriented in a way that conforms to the predefined orientation, execute the command using the first device.

12. A method, comprising:
receiving voice input at a first device;
using a directional microphone to identify a direction in which a source of the voice input is located;
tracking a second device using one or more ultra-wideband (UWB) signals received from the second device;
based on the identification using the directional microphone of the direction in which the source of the voice input is located, determining that a current location of the second device as determined from the tracking matches, to at least within a threshold level of tolerance, the direction in which the source is located; and
based on the determining of the match, performing, at the first device, an operation using the voice input.

13. The method of claim 12, wherein the operation comprises execution of a command provided via the voice input.

14. The method of claim 12, wherein the operation comprises authentication of a user at least in part based on the voice input.

15. The method of claim 12, comprising:
tracking an orientation of the second device using the one or more UWB signals; and
based on the orientation of the second device, performing the operation using the voice input.

16. The method of claim 12, comprising:
tracking an orientation of the second device using one or more signals generated based on input from a gyroscope on the second device; and
based on the orientation of the second device, performing the operation using the voice input.

17. The method of claim 12, comprising:
executing, using the voice input, voice identification (ID) to identify a particular user that provided the voice input as being a user authorized to control the first device based on the voice input;
based on the identification of the particular user, performing the operation at the first device, the operation related to adjustment of a setting of a thermostat.

18. At least one computer readable storage medium (CRSM) that is not a transitory signal, the computer readable storage medium comprising instructions executable by at least one processor to:
receive voice input at a first device;
use a directional microphone to identify a direction in which a source of the voice input is located;
track a second device using one or more ultra-wideband (UWB) signals received from the second device;
based on the identification using the directional microphone of the direction in which the source of the voice input is located, determine that a current location of the second device as determined from the tracking matches, to at least within a threshold level of tolerance, the direction in which the source is located; and based on the determination of the match, perform an operation using the voice input.

19. The CRSM of claim 18, wherein the instructions are executable to:

execute, using the voice input, voice identification (ID) to identify a particular user that provided the voice input as being a user authorized to control the first device based on the voice input;

based on the identification of the particular user, perform the operation using the voice input.

20. The CRSM of claim 18, wherein the operation is related to adjustment of a setting of a thermostat.

* * * * *